United States Patent
Dreyer et al.

(10) Patent No.: US 11,597,864 B2
(45) Date of Patent: Mar. 7, 2023

(54) FLUID DIVERSION COMPOSITION IN WELL STIMULATION

(71) Applicant: ChampionX USA Inc., Sugar Land, TX (US)

(72) Inventors: Daniel Dreyer, Rosenburg, TX (US); Vyacheslav Boyraskikh, Sugar Land, TX (US); Yuntao Thomas Hu, The Woodlands, TX (US); Pious Kurian, Sugar Land, TX (US); Joseph Paul Street, Friendswood, TX (US); Narongsak Tonmukayakul, Spring, TX (US); Kin-Tai Chang, Sugar Land, TX (US)

(73) Assignee: CHAMPIONX USA INC., Sugar Land, TX (US)

( * ) Notice: Subject to any disclaimer, the term of this patent is extended or adjusted under 35 U.S.C. 154(b) by 0 days.

(21) Appl. No.: 17/139,539

(22) Filed: Dec. 31, 2020

(65) Prior Publication Data
US 2021/0122967 A1    Apr. 29, 2021

Related U.S. Application Data

(62) Division of application No. 16/193,542, filed on Nov. 16, 2018, now Pat. No. 10,883,036.
(Continued)

(51) Int. Cl.
*C09K 8/508*    (2006.01)
*C09K 8/03*    (2006.01)
(Continued)

(52) U.S. Cl.
CPC ............. *C09K 8/5086* (2013.01); *C09K 8/03* (2013.01); *C09K 8/5083* (2013.01); *C09K 8/516* (2013.01); *E21B 33/138* (2013.01); *E21B 43/26* (2013.01)

(58) Field of Classification Search
CPC ...... C09K 8/5086; C09K 8/03; C09K 8/5083; C09K 8/516; E21B 33/138; E21B 43/26
See application file for complete search history.

(56) References Cited

U.S. PATENT DOCUMENTS

| | | | |
|---|---|---|---|
| 4,848,467 A | 7/1989 | Cantu et al. | |
| 4,902,127 A | 2/1990 | Byer et al. | |

(Continued)

FOREIGN PATENT DOCUMENTS

| | | | |
|---|---|---|---|
| WO | 2009088317 A1 | 7/2009 | |
| WO | 2016077354 A1 | 5/2016 | |

(Continued)

OTHER PUBLICATIONS

Reddy et al., "Activator Development for Controlling Degradation Rates of Polymeric Diverting Agents", Society of Petroleum Engineers, SPE Production & Operations, Feb. 2014, vol. 29, No. 01, pp. 42-50.

(Continued)

*Primary Examiner* — Crystal J. Lee
(74) *Attorney, Agent, or Firm* — Klemchuk PLLC; Keith C. Rawlins

(57) ABSTRACT

Described are methods and compositions for treating a subterranean formation. The method comprising introducing into the subterranean formation via a well-bore a diverter composition, the diverter composition comprising a combination of at least one deformable particle and at least one non-deformable particle; and allowing the diverter composition to block the flow of at least a portion of a treatment fluid from a first location within the well-bore to a second location.

19 Claims, 4 Drawing Sheets

Related U.S. Application Data

(60) Provisional application No. 62/591,631, filed on Nov. 28, 2017.

(51) Int. Cl.
*C09K 8/516* (2006.01)
*E21B 33/138* (2006.01)
*E21B 43/26* (2006.01)

(56) References Cited

U.S. PATENT DOCUMENTS

| | | | |
|---|---|---|---|
| 4,957,165 | A | 9/1990 | Cantu et al. |
| 4,986,355 | A | 1/1991 | Casad et al. |
| 6,059,034 | A * | 5/2000 | Rickards .................. C09K 8/80 166/280.2 |
| 6,169,058 | B1 | 1/2001 | Le et al. |
| 6,330,916 | B1 | 12/2001 | Rickards et al. |
| 7,135,231 | B1 * | 11/2006 | Sinclair .................. C09K 8/805 428/407 |
| 7,931,084 | B2 | 4/2011 | Nguyen et al. |
| 8,109,335 | B2 | 2/2012 | Luo et al. |
| 9,120,965 | B2 | 9/2015 | Kurian et al. |
| 2006/0175059 | A1 | 8/2006 | Sinclair et al. |
| 2010/0212906 | A1 | 8/2010 | Fulton et al. |
| 2011/0005753 | A1 | 1/2011 | Todd et al. |
| 2012/0285692 | A1 | 11/2012 | Potapenko et al. |
| 2013/0025860 | A1 * | 1/2013 | Robb .................. C09K 8/035 166/279 |
| 2016/0108713 | A1 | 4/2016 | Dunaeva et al. |
| 2016/0160108 | A1 | 6/2016 | Reddy et al. |
| 2016/0177693 | A1 * | 6/2016 | Gomaa .................. E21B 43/26 166/250.07 |
| 2016/0304773 | A1 | 10/2016 | Reddy et al. |
| 2016/0333258 | A1 * | 11/2016 | Drake .................. E21B 37/00 |
| 2016/0376882 | A1 | 12/2016 | Mendell et al. |
| 2017/0051599 | A1 | 2/2017 | Bestaoui-Spurr et al. |
| 2017/0114267 | A1 | 4/2017 | Lahman et al. |

FOREIGN PATENT DOCUMENTS

| | | |
|---|---|---|
| WO | 2016105382 A1 | 6/2016 |
| WO | 2016176381 A1 | 11/2016 |
| WO | 2017/131707 A1 | 8/2017 |

OTHER PUBLICATIONS

Gallus et al., Fluid Diversion to Improve Well Stimulation, InJoint AIME-MMIJ Meeting held in Tokyo, Japan May 25-17, 1972, Society of Petroleum Engineers, SPE 3811, 16 pages.

Rahim et al., "Optimizing Well Potential-Technologies That Impact Hydraulic Fracturing Efficiency", Society of Petroleum Engineers, SPE Middle East Oil & Gas Show and Conference held in Manama, Kingdom of Bahrain, Mar. 3-9, 2017, SPE-183725-MS, 10 pages.

Spurr et al., Far-field diversion agent using a combintion of a soluble particle diverter with specially engineered proppant, Society of Petroleum Engineers—SPE Asia Pacific Hydraulic Fracturing Conference held in Beijing, China, Aug. 24-26, 2016, SPE-181851-MS, 15 pages.

Carathers et al., "Polymer Gelled Block: a Diverting Agent for Acid Stimulations", Conference: Proceedings of the Thirty-First Annual Southwestern Petroleum Short Course.; Sponsor: Southwestern Petroleum Short Course Assoc, Texas Tech University, Lubbock, TX, Apr. 1984, pp. 89-98.

International Search Report for International Application No. PCT/US2018/061538, dated Feb. 28, 2019, 6 pages.

Written Opinion for International Application No. PCT/US2018/061538, dated Feb. 28, 2019, 11 pages.

Bai et al., "Preformed Particle Gel for Conformance Control: Factors Affecting Its Properties and Applications," SPE Reservoir Evaluation & Engineering, Aug. 2007, pp. 415-422.

Zhao et al., "Investigation of Preparation and Mechanisms of a Dispersed Particle Gel Formed from a Polymer Gel at Room Temperature," PLOS One, vol. 8, Issue 12, Dec. 6, 2013, 9 pages.

* cited by examiner

FLUID DIVERSION COMPOSITION IN WELL STIMULATION

CROSS REFERENCE TO RELATED APPLICATIONS

This application is a divisional of U.S. application Ser. No. 16/193,542, filed Nov. 16, 2018, which claims the benefit of U.S. provisional application No. 62/591,631, filed Nov. 28, 2017 and each of the cited documents are incorporated herein by reference in their entireties.

FIELD OF THE INVENTION

Embodiments of the present invention relate to compositions and methods for increasing recovery of hydrocarbons from a subterranean formation.

BACKGROUND

A wellbore is often drilled into a subterranean formation and stimulation operations are typically performed to enhance the production of hydrocarbons (e.g. oil, gas, and the like). Hydraulic fracturing is a widely-used well stimulation technique. Hydraulic fracturing, as the name suggests, involves injecting a fluid under pressure through a wellbore. The pressurized fluid then fractures or cracks the surrounding subterranean formation thereby permitting the hydrocarbons to flow more freely through the fractures, and be recovered through the wellbore.

Fluids typically follow the path of least resistance. When hydraulic fracturing fluids are used for well stimulation, they can result in zones being over treated or fractures growing into undesired zones, or both thereby not creating a desired level of complexity in the fracture network to provide the desired stimulation.

Particulate materials such as gilsonite, rock salt, and benzoic acid flakes often were deployed as materials to divert the flow of the fracturing fluid. The diverter materials block the path of least resistance and redirect fracturing fluids to the areas where they are needed for maximum stimulation performance. To perform effectively, diverter materials must remain intact throughout the fracturing operation to create the desired "barrier," then dissolve after the operation is completed to permit hydrocarbon flow into the well.

SUMMARY

Described herein is a method and composition of treating a subterranean formation.

In one aspect of the invention is disclosed a method for treating a subterranean formation, comprising:
introducing into the subterranean formation via a wellbore a first treatment fluid comprising a diverter composition, the diverter composition comprising a combination of at least one deformable particle and at least one non-deformable particle; and
allowing the diverter composition to block the flow of at least a portion of the first treatment fluid from a first location within the well-bore diverting flow to a second location.

In another aspect of the invention is disclosed a method for treating a subterranean formation, comprising:
providing a first treatment fluid comprising a diverter composition, the diverter composition comprising a combination of at least one deformable particle and at least one non-deformable particle;
introducing into the subterranean formation via a wellbore the diverter composition, allowing the diverter composition to block the flow of at least a portion of a first treatment fluid from a first location within the well-bore diverting flow to a second location.

In still another aspect of the invention is disclosed a method for treating a subterranean formation, comprising:
introducing into the subterranean formation via a wellbore a first treatment fluid comprising a diverter composition, the diverter composition comprising a combination of at least one degradable, deformable particle and at least one degradable, non-deformable particle; and
allowing the diverter composition to block the flow of at least a portion of the first treatment fluid from a first location within the well-bore diverting flow to a second location.

In another aspect of the invention is a method for treating a subterranean formation, comprising:
providing a first treatment fluid comprising a diverter composition, the diverter composition comprising a combination of at least one degradable, deformable particle and at least one degradable, non-deformable particle;
introducing into the subterranean formation via a wellbore the diverter composition,
allowing the diverter composition to block the flow of at least a portion of a first treatment fluid from a first location within the well-bore diverting flow to a second location.

In one aspect of the invention is disclosed a diverter composition comprising a combination of at least one deformable particle and at least one non-deformable particle.

The disclosed method and composition are useful for treating subterranean formations or diverting the flow of a treatment fluid.

DETAILED DESCRIPTION

Figure 1:
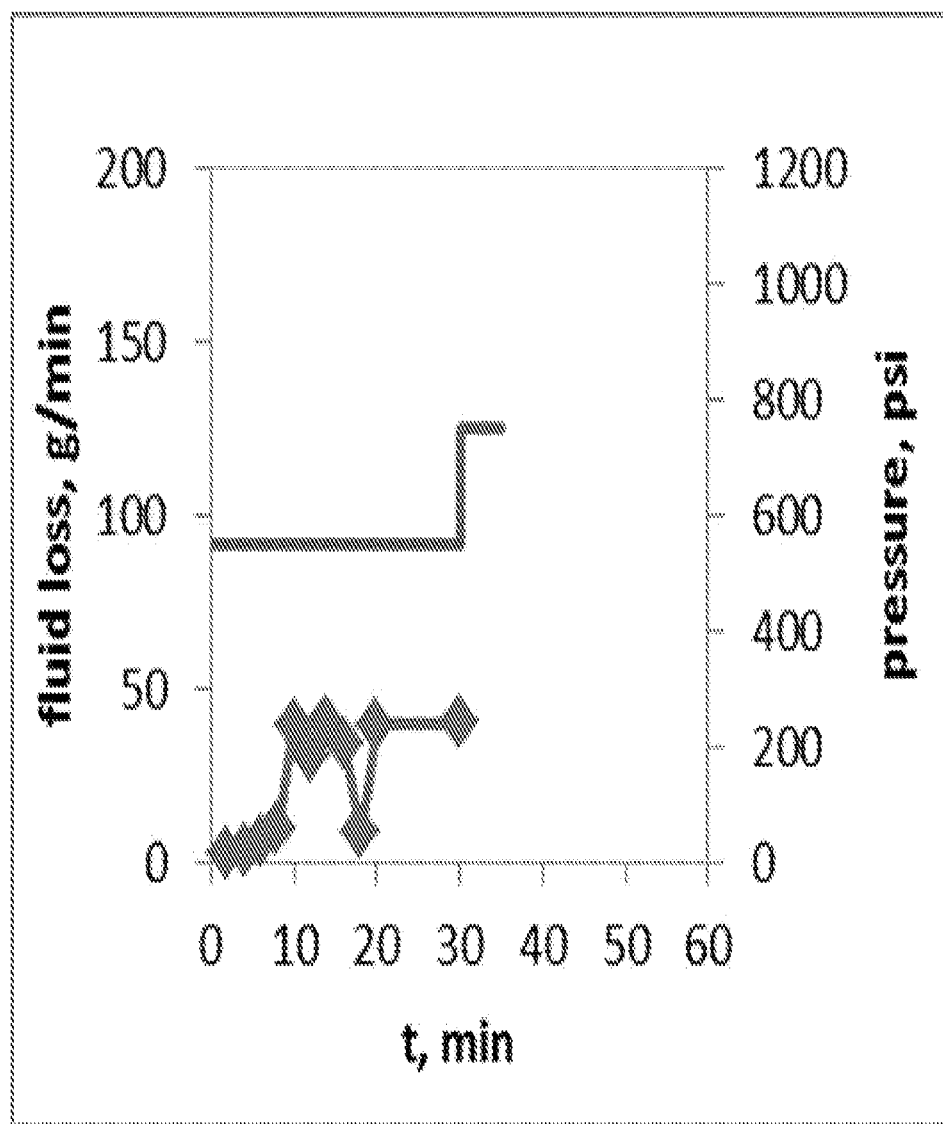
FIG. 1 is a graph showing fluid loss for a deformable only particle with respect to pressure and time.

Although the present disclosure provides references to particular embodiments, persons skilled in the art will recognize that changes may be made in form and detail without departing from the spirit and scope of the invention. Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents and other references mentioned herein are incorporated by reference in their entirety. The materials, methods, and examples disclosed herein are illustrative only and not intended to be limiting.

As used herein, the term "carrier fluid" refers to a fluid used to facilitate storage, shipping, and handling of a diverter composition.

As used herein, the term "deformable" refers to materials or particles that change shape or substantially change shape when acted upon by differential pressure experienced under the hydraulic force of the treatment fluid (or medium) such as will be experienced once the particles effectively block and close a particular flow path of the treatment fluid.

As used herein, the term "degradable" when used in reference to the diverter composition means the conversion of a material into compounds that do not retain all the characteristics of the material before the break down or are broken into constituent or derivative species. Chemical processes of degradation may include hydrolysis, thermolysis, dissolution, depolymerization, or other similar process that change the chemical nature of the material. Physical processes of degradation may include melting (or other phase changes), fusion, compaction, sintering, or other processes that change the physical nature of the material.

As used herein, the term "diverter" "diverting," "diversion," or grammatical equivalents thereof means a composition used in well treatments (e.g. stimulation treatments) that at least temporarily, selectively control the rate of flow of a fluid e.g., by reducing or stopping the flow rate into a subterranean feature.

As used herein, the term "fracturing" means the process of breaking open, or cracking, or separating geologic formations to increase production of hydrocarbons from a hydrocarbon reservoir. The breaking open, cracking or separating the geologic formations can mean making new breaks, cracks, or separations, or enlarging pre-existing breaks, cracks, or separations.

As used herein, the term "introducing" when used in reference to the method of treating a subterranean formation includes any method known in the art for placing fluid or material within a well, well bore or subterranean formation.

As used herein, the term "non-deformable" refers to materials or particles that do not change shape or do not substantially change shape when acted upon by differential pressures experienced under the hydraulic force of the treatment fluid (or medium) such as will be experienced once the particles effectively block and close a particular flow path of the treatment fluid As used herein, the term "non-swellable" means materials or particles that, once mixed into the treatment fluid, minimally change in volume or mass or both such that the volume or mass or both of the materials or particles increase by less than 10% relative to their initial volume or mass or both within one hour.

As used herein, the term "swellable" means materials or particles that, once mixed into the treatment fluid, change in volume or mass or both (namely expand) to increase at least 10% relative to its initial volume, mass, or both within one hour.

As used herein, the term "particle size," "particulate size" refers to the diameter of the smallest imaginary circumscribed sphere.

As used herein, the term "produced water" means water that is obtained from a subterranean reservoir and is collected during a hydrocarbon recovery process. Produced water includes residual hydrocarbon products entrained in the water and can include one or more of connate (native water present in the subterranean formation along with the hydrocarbon), brackish water, and sea water.

As used herein, the term "treating," refers to using some agent (e.g. a fluid) for changing a condition in a subterranean formation.

As used herein, the term "treatment fluid" refers to a fluid introduced into a subterranean formation. The treatment fluid can include the diverter composition.

As used herein, the terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references unless the context clearly dictates otherwise. The present disclosure also contemplates other embodiments "comprising," "consisting of" and "consisting essentially of," the embodiments or elements presented herein, whether explicitly set forth or not.

As used herein, the term "optional" or "optionally" means that the subsequently described event or circumstance may but need not occur, and that the description includes instances where the event or circumstance occurs and instances in which it does not.

As used herein, the term "about" modifying, for example, the quantity of an ingredient in a composition, concentration, volume, process temperature, process time, yield, flow rate, pressure, and like values, and ranges thereof, employed in describing the embodiments of the disclosure, refers to variation in the numerical quantity that can occur, for example, through typical measuring and handling procedures used for making compounds, compositions, concentrates or use formulations; through inadvertent error in these procedures; through differences in the manufacture, source, or purity of starting materials or ingredients used to carry out the methods, and like proximate considerations. The term "about" also encompasses amounts that differ due to aging of a formulation with a particular initial concentration or mixture, and amounts that differ due to mixing or processing a formulation with a particular initial concentration or mixture. Where modified by the term "about" the claims appended hereto include equivalents to these quantities. Further, where "about" is employed to describe a range of values, for example "about 1 to 5" the recitation means "1 to 5" and "about 1 to about 5" and "1 to about 5" and "about 1 to 5" unless specifically limited by context.

As used herein, the term "significant" or "significantly" means at least half, or 50% by some measure as defined or as determined by context. For example, a solution that contains a "significant amount" of a component contains 50% or more of that component by weight, or by volume, or by some other measure as appropriate and in context. A solution wherein a component has been significantly removed has had at least 50% of the original amount of that component removed by weight, or by volume, or by some other measure as appropriate and in context.

As used herein, the term "substantially" means "consisting essentially of", as that term is construed in U.S. patent law, and includes "consisting of" as that term is construed in U.S. patent law. For example, a solution that is "substantially free" of a specified compound or material may be free of that compound or material, or may have a minor amount of that compound or material present, such as through unintended contamination, side reactions, or incomplete purification. A "minor amount" may be a trace, an unmeasurable amount, an amount that does not interfere with a value or property, or some other amount as provided in context. A composition that has "substantially only" a provided list of components may consist of only those components, or have a trace amount of some other component present, or have one or more additional components that do not materially affect the properties of the composition. Additionally, "substantially" modifying, for example, the type or quantity of an ingredient in a composition, a property, a measurable quantity, a method, a value, or a range, employed in describing the embodiments of the disclosure, refers to a variation that does not affect the overall recited composition, property, quantity, method, value, or range thereof in a manner that negates an intended composition, property, quantity, method, value, or range. Where modified by the term "substantially" the claims appended hereto include equivalents according to this definition.

As used herein, any recited ranges of values contemplate all values within the range and are to be construed as support for claims reciting any sub-ranges having endpoints which are real number values within the recited range. By way of a hypothetical illustrative example, a disclosure in this specification of a range of from 1 to 5 shall be considered to support claims to any of the following ranges: 1-5; 1-4; 1-3; 1-2; 2-5; 2-4; 2-3; 3-5; 3-4; and 4-5.

DISCUSSION

Disclosed herein are diverter compositions and the use of the diverter compositions in treating subterranean formations. The diverter compositions are a combination of deformable particles and non-deformable particles. The diverter compositions perform better than either deformable particles or non-deformable particles on their own. The diverter composition withstands compressive pressure (thousands of pounds per square inch (psi)) during a hydraulic fracturing treatment.

Without being bound by theory, the non-deformable particles of the diverter composition bears much of the compressive load of the hydraulic fracturing operation because they are sufficiently rigid, and the deformable particles help distribute the load, as well as fill in gaps between the non-deformable particles that might permit residual fluid leak off. As a result, the "plugging" action of the diverter composition is more efficient than either particle type individually, particularly at high pressures. The combination of the deformable and non-deformable particles provides the benefit of a reduced amount of the composition being equally or more effective than greater amounts of either of the particle types individually. Furthermore, the composition is more effective at reducing the rate of fluid loss than either component alone, and therefore is superior at blocking redirecting fluid flow. In other words, less material is needed in the diverter composition of the combination of particles to obtain an equivalent degree of fluid blockage and redirection. Furthermore the diverter composition can reduce lost time and expense associated with repeated trial and error of treatment doses to obtain the desired diversion effect.

The deformable particles possess the capacity to expand or fill in gaps such that they can resist unwanted fluid flow through the formation. The deformable particles can readily penetrate into fractures of a subterranean formation if the deformable particles are of a suitable size.

Without being bound by theory, deformable particles are believed to be effective at plugging pores of varying size. In some embodiments, the particles are deformable, swellable particles. In embodiments, swelling may occur after a non- or partially swollen particle has been introduced into a pore, or swelling may occur before introduction and then the particle can be squeezed or compressed into a pore. An advantage of deformable, swellable particles over non-deformable particles for an application such as plugging or diversion is that the particle size distribution (PSD) of the composition is more tolerant of a wide variety of pore sizes because the degree of swelling of a given particle is variable (e.g., depending on how much liquid is taken up).

In embodiments, the deformable particles are polymers of varying molecular weights. In some embodiments, the deformable polymers may be hydrophilic. In other embodiments, the deformable particles incorporate hydrophobic components (for example, to reduce the uptake of water into the particle and the overall rate of swelling). The deformable particles may or may not be cross-linked. If not cross-linked, the deformable particles, in some embodiments are linear or have more elaborate structures (e.g., branching, dendrimeric, star polymers, and the like). In some embodiments, the deformable particles are homopolymers or copolymers prepared from multiple monomers in random, block, or alternating configuration. In embodiments, the deformable particles incorporate degradable components to facilitate degradation of the particles following placement in the fracture. In embodiments, these degradable components include species with hydrolysable bonds, thermally degradable bonds, other chemically reactive moieties, or combinations thereof.

Examples of deformable polymers include, but are not limited to, crosslinked polyacrylamide, crosslinked polyacrylate, crosslinked hydrolyzed polyacrylonitrile, salts of carboxyalkyi starch, salts of carboxymethyl starch, salts of carboxyalkyi cellulose, hydroxylethyl cellulose, salts of crosslinked carboxyalkyi polysaccharide, crosslinked copolymers of acrylamide and acrylate monomers, starch grafted with acrylonitrile and acrylate monomers, crosslinked polymers of two or more of allylsulfonates, 2-acrylamido-2-methyl-1-propanesulfonic acid, 3-allyloxy-2-hydroxy-1-propane-sulfonic acid, acrylamide, acrylic acid monomers, and any combination thereof. In embodiments, the deformable polymers include alkyl acrylates (such as include methyl acrylate, ethyl acrylate, butyl acrylate); alkyl methacrylates (examples include methyl methacrylate, ethyl methacrylate, butyl methacrylate); Dimethyl acrylamide (DMA); Methacrylic acid; Acrylonitrile; Vinylpyrrolidone; N-vinylformamide (NVF); hydroxyethylmethacrylate (HEMA); 2-acryliamido-2-methylpropane sulfonic acid (AMPS); vinyl acetate. In embodiments, the deformable polymers include deformable polyesters such as certain forms of poly(lactic acid) (PLA), poly(glycolic acid) (PGA), poly(caprolactone), poly(butyrolactone), poly(ethylene terephthalate), other alkyl polyester, other aromatic polyesters, and copolymers thereof. In other embodiments the defomable particles include diallyl-dimethylammonium salts, benzyl-diallylmethylammonium salts, methacrylamidopropyltrimethylammonium salts, acrylamidopropyltrimethylammonium salts, acrylamide, acrylic acid, acrylate monomers, N-vinylformamide, N-vinylpyrrolidone, vinyl acetate, and any combination thereof.

In other embodiments, the deformable, swellable particles can include particles described in U.S. Pat. No. 7,902,127, which is incorporated herein in its entirety.

In some embodiments, the deformable particles have a volume average particle size (as determined by common particle sizing techniques, including but not limited to sieve analysis, flow velocimetry, laser diffraction analysis, optical microscopy, or other suitable methods) that ranges from 0.05 to 100,000 microns; 0.1 to 10,000 microns; or 1 to 5,000 microns. In an embodiment, the deformable volume average particle size diameter is 0.1 to 3 microns. In an embodiment, the deformable volume average particle size diameter is 0.1 to 1000 microns. In another embodiment, the deformable volume average particle size diameter of the particles is 1 to 500 microns. In another embodiment, the deformable volume average particle size diameter of the particles is about 1 to about 50 microns.

In embodiments, the deformable, swellable particles swell in aqueous-based liquids. In other embodiments, deformable, swellable particles swell in saline (e.g. 1% saline solution) or brackish water, produced water, water-containing emulsions, or water.

In some embodiments, the deformable, swellable particles expand to 200% of its original volume. In some embodiments, the deformable, swellable particle expands to at least 200 to 150% of its original volume, 150 to 120%, 120 to 100% and 100 to 50% of its original. In other embodiments, the size of the deformable, swellable particles increases by 10% its original volume in 10 minutes. In some embodiments, polyacrylamide in a 10% xanthum gum containing water solution expands to about 120% of its original volume.

In some embodiments, the size of the deformable, swellable particles increases by 200% its original volume in 30 minutes after contacting fluid. In other embodiments, the size of the deformable, swellable particles increases by 100% its original volume in 15 minutes, or 50% its original volume in 7.5 minutes.

In embodiments, the deformable particles may be tailored or selected based on the topography of the subterranean formation. In some embodiments, the deformable particles may be sensitive to pH and other factors. The extent of expanding or swelling of the deformable, swellable particles is dependent on the particular solution used. In some embodiments, deformable, swellable materials may expand when exposed to an aqueous fluid, and may not expand in an acidic fluid. In some embodiments, the deformable, swellable particles only swell upon hydrolysis of cross links (e.g. as in U.S. Pat. No. 7,902,127).

The non-deformable particles may be any material that does not swell to a significant extent, and provides mechanical strength to the diverter composition. Examples include, but are not limited to poly(lactic acid) (PLA), polyethylene terephthalate (PET), or other polyesters, polyamides, polyethers, polycarbonates, polyurethanes, polysaccharides, peptides/polypeptides, urea-formaldehyde copolymer, other hydrolysable or degradable polymers, partially or wholly soluble or degradable inorganic salts (e.g., NaCl, CaCl2), partially or wholly soluble or degradable metal oxides/hydroxides (e.g., Ca(OH)2, Mg(OH)2), other partially or wholly soluble or degradable inorganic materials (e.g., polyphosphates or other glasses, minerals, carbon materials and nanomaterials, silicas, aluminas), benzoic acid and other sparingly soluble organic compounds (e.g. other organic acids, solid organic alcohols and salts of organic compounds), natural plant- or biologically-derived materials (such as nut shells, bark, cellulosic materials) and other biomass, fibrous materials (e.g. cellulosic fibers and cellulose derivatives) and combinations thereof.

In embodiments, at least one non-deformable particle includes rock salt, polyesters, polyamides, polyethers, polycarbonates, polyurethanes, polysaccharides, peptides/polypeptides, urea-formaldehyde copolymer, other hydrolysable or degradable polymers, partially or wholly soluble or degradable inorganic salts (e.g., NaCl, CaCl2), partially or wholly soluble or degradable metal oxides/hydroxides (e.g., Ca(OH)2, Mg(OH)2), other partially or wholly soluble or degradable inorganic materials (e.g., polyphosphates or other glasses, minerals, carbon materials and nanomaterials, silicas, aluminas), benzoic acid and other sparingly soluble organic compounds, natural plant- or biologically-derived materials (such as nut shells, bark, cellulosic materials and other biomass; fibrous materials and combinations thereof.

In embodiments, non-deformable particle particles that may be used include polymer materials that are capable of generating acids upon degradation. These polymer materials may herein be referred to as "polymeric acid precursors." These materials are typically solids at room temperature. The polymeric acid precursor materials include the polymers and oligomers that hydrolyze or degrade in certain chemical environments under known and controllable conditions of temperature, time, and pH to release organic acid molecules that may be referred to as "monomeric organic acids." As used herein, the expression "monomeric organic acid" or "monomeric acid" may also include dimeric acid or acid with a small number of linked monomer units that function similarly to monomer acids composed of only one monomer unit.

Polymer materials may include those polyesters obtained by polymerization of hydroxycarboxylic acids, such as the aliphatic polyester of lactic acid, referred to as polylactic acid; glycolic acid, referred to as polyglycolic acid; 3-hydroxbutyric acid, referred to as polyhydroxybutyrate; 2-hydroxyvaleric acid, referred to as poly hydroxy valerate; epsilon caprolactone, referred to as polyepsilon caprolactone or polycaprolactone; the polyesters obtained by esterification of hydroxyl amino acids such as serine, threonine and tyrosine; and the copolymers obtained by mixtures of the monomers listed above.

In some embodiments, under the appropriate conditions (e.g., pH, temperature, water content) polyesters can hydrolyze and degrade to yield hydroxycarboxylic acid and compounds that pertain to "monomeric acids."

In embodiments, a suitable polymeric acid precursor is the polymer of lactic acid, sometimes called polylactic acid, "PLA," polylactate or polylactide. Lactic acid is a chiral molecule and has two optical isomers. These are D-lactic acid and L-lactic acid. The poly(L-lactic acid) and poly(D-lactic acid) forms are generally crystalline in nature. Polymerization of a mixture of the L- and D-lactic acids to poly(DL-lactic acid) results in a polymer that is more amorphous in nature. In embodiments, the polymers are linear. The degree of polymerization of the linear polylactic acid can vary from a few units (2-10 units) (oligomers) to several thousands (e.g. 2000-5000). In some embodiments, cyclic structures are also used. The degree of polymerization of the cyclic structures may be smaller than that of the linear polymers. These cyclic structures may include cyclic dimers.

In some embodiments, the non-deformable particle polymer is of glycolic acid (hydroxy acetic acid), also known as polyglycolic acid ("PGA"), or polyglycolide. In some embodiments, materials suitable as polymeric acid precursors are all those polymers of glycolic acid with itself or other hydroxy-acid-containing moieties, as described in U.S. Pat. Nos. 4,848,467; 4,957,165; and 4,986,355, which are herein incorporated by reference.

The polylactic acid and polyglycolic acid may each be used as homopolymers, which may contain less than about 0.1% by weight of other comonomers. As used with reference to polylactic acid, "homopolymer(s)" is meant to include polymers of D-lactic acid, L-lactic acid and/or mixtures or copolymers of pure D-lactic acid and pure L-lactic acid. In some embodiments, random copolymers of lactic acid and glycolic acid and block copolymers of polylactic acid and polyglycolic acid are used. In some embodiments, the homopolymers copolymers or combinations thereof are also used.

In some embodiments, polyesters of hydroxycarboxylic acids are used as polymeric acid precursors are the polymers of hydroxyvaleric acid (polyhydroxyvalerate), hydroxybutyric acid (polyhydroxybutyrate) and their copolymers with other hydroxycarboxylic acids. Polyesters resulting from the ring opening polymerization of lactones such as epsilon caprolactone (polyepsiloncaprolactone) or copolymers of hydroxyacids and lactones may also be used as polymeric acid precursors.

In some embodiments, polyesters obtained by esterification of other hydroxyl-containing acid-containing monomers such as hydroxyaminoacids are used as polymeric acid precursors. Naturally occurring amino acids are L-aminoacids. Among the 20 most common amino acids the three that contain hydroxyl groups are L-serine, L-threonine, and L-tyrosine. These amino acids may be polymerized to yield polyesters at the appropriate temperature and using appropriate catalysts by reaction of their alcohol and their carboxylic acid group. D-amino acids are less common in nature, but in embodiments their polymers and copolymers are also used as polymeric acid precursors.

In embodiments, the non-deformable particle particles incorporate degradable components to facilitate degradation of the non-deformable particles following placement in the fracture. In embodiments, the degradable components include species with hydrolysable bonds, thermally degradable bonds, other chemically reactive moieties, or combinations thereof.

In some embodiments, the non-deformable particles have a particle size that range from 0.05 to 100,000 microns, 0.1 to 10,000 microns or 1 to 5,000 microns.

Depending on the diverter application, the non-deformable particle and deformable particles can be tailored accordingly. In some embodiments, suitable non-deformable particle particles include PLA polymers. The type of PLA polymer may also be tailored depending on the application. In embodiments where a higher bottom-hole static temperature (BHST) and/or longer lasting plug of diverter is required, a high molecular weight PLA, crystalline over amorphous PLA, and isomeric over racemic PLA may be used. In embodiments where a lower temperature well is being targeted, or the diverter may need to break down rapidly, low molecular weight PLA are used over high molecular weight PLA, amorphous over crystalline, and racemic over isomeric PLA.

In embodiments, the deformable particle can be deposited onto the outer surface of the non-deformable particles resulting in a deformable particle or material surrounding a non-deformable inner core. In embodiments, such diverter compositions with an outer shell or layer of deformable particles surrounding an inner core of non-deformable particles are used as scale inhibitors. Therefore, during application of the treatment fluid, the diverter composition functions as a diverter, and upon completion of the hydraulic fracturing operation the composition would slowly dissolve into the produced fluid and inhibit the formation of a variety of inorganic scales, including but not limited to calcite, barite, gypsum, and celestite. In embodiments, the diverter composition includes a copolymer of acrylamide and acrylic acid as the outer shell. In other embodiments, the deformable polymer includes polyacrylamide, polyacrylate, poly (AMPS), or copolymers thereof as the outer shell surrounding a polyphosphate glass.

In some embodiments either the deformable or non-deformable particle may have catalytic agents incorporated within the particle that assist in the eventual degradation of one or both of the particle types. Examples of catalytic agents include enzymes or latently acidic or basic materials."

The diverter composition comprises, consists essentially of, or consists of deformable particles and non-deformable particle particles. The particles are solids, which can include gels, fibers, agglomerates, and spheres. The morphology for either type, deformable or non-deformable particle, may be shapes ranging from roughly spherical to irregular fractal shapes or may be elongated fiber shapes.

Both particles must eventually degrade to substantially or fully soluble components to prevent damage of the oil/gas-producing formation or overall reduction in production of the well. Small amounts of residue may be left behind when some materials are used, but these should be selected such that the well's production is not significantly affected.

When injected downhole, the diverter composition begins to fill in the fractures, voids and fissure and high permeability streaks through which aqueous fluids could otherwise pass unrestricted. In embodiments that include the deformable, swellable particles, these polymers absorb the aqueous fluid and swell into a mass that is resistant or substantially resistant to the flow of fluid, reducing the flow into or through the fractures, voids, fissures, and high permeability streaks through which aqueous fluids could otherwise pass unrestricted. In embodiments, while the deformable particles withstand a relatively large pressure amount, they resist being dislodged from their position.

For non-deformable particles, the efficacy of the composition as being able to plug or divert is dependent on the particle size distribution relative to the pore size. For deformable particles, the efficacy of the composition is much less sensitive to this relationship.

The individual and combined particle size distributions of the deformable and non-deformable particle can be infinitely varied. In embodiments, crushing, grinding, sizing, and isolation methods are used to obtain the desired particle size distribution of the individual components, as well as the combined diverter composition.

In embodiments, the deformable particles are present in the diverter composition from about 1 wt % to about 99 wt % of the diverter composition, from 5 wt % to about 75 wt %, from 10 wt % to 70 wt %, from 15 wt % to 60 wt %, from 15 wt % to 50 wt %, from 20 wt % to 40 wt %. In embodiments, the non-deformable particle particles are present in the diverter composition about 1 wt % to about 99 wt % of the diverter composition, from 5 wt % to about 75 wt %, from 10 wt % to 70 wt %, from 15 wt % to 60 wt %, from 20 wt % to 50 wt %, from 10 wt % to 50 wt %, of the diverter composition.

The diverter composition can withstand pressures from 20,000 psi to 10 psi. In some embodiments, the diverter composition can withstand pressure from 10,000 to 50 psi, from 5,000 psi to 100 psi, 20,000 psi to 100 psi, from 1,000 psi to 100 psi.

In some embodiments the diverter composition can be used in subterranean formations having temperature from 100° F. to 450° F., 120° F. to 250° F., 200° F. to 300° F., 300° F. to 400° F., or 400° F. to 450° F.

When ready to use, the diverter composition is introduced into a subterranean formation using a treatment fluid. In embodiments, the treatment fluid may be water, e.g. fresh water, produced water, seawater. In some embodiments, treatment fluids include hydratable gels (e.g. guars, polysaccharides, xanthan, hydroxy-ethyl-cellulose, and the like), a cross-linked hydratable gel, a viscosified acid (e.g. gel-based), an emulsified acid (e.g. oil outer phase), an energized fluid (e.g. an $N_2$ or $CO_2$ based foam), and an oil-based fluid including a gelled, foamed, or otherwise viscosified oil. In embodiments, the treatment fluid is a brine, or includes a brine.

In embodiments, treatment fluid includes hydrochloric acid, hydrofluoric acid, ammonium bifluoride, formic acid, acetic acid, lactic acid, glycolic acid, maleic acid, tartaric acid, sulfamic acid, malic acid, citric acid, methyl-sulfamic acid, chloro-acetic acid, an amino-poly-carboxylic acid, 3-hydroxypropionic acid, a poly-amino-poly-carboxylic acid, and/or a salt of any acid. In some embodiments, the treatment fluid includes a poly-amino-poly-carboxylic acid, and is a trisodium hydroxyl-ethyl-ethylene-diamine triacetate, mono-ammonium salts of hydroxyl-ethyl-ethylene-diamine triacetate, and/or mono-sodium salts of hydroxyl-ethyl-ethylene-diamine tetra-acetate.

In embodiments, the diverter composition in a treatment fluid is in an amount from 1,000 ppm to 200,000 ppm of the diverter composition. In one embodiment, the diverter composition in the treatment fluid is from 5,000 ppm to 100,000 ppm of the diverter composition, or 5,000 ppm to 50,000 ppm, based on the diverter composition.

In embodiments, the deformable particles, non-deformable particles or both also have additional functionality, aside from the roles described above. For example, a polyphosphate glass may be used as a hard particle. Polyphosphates are useful as slow release scale inhibitors with dissolution rates that vary with their composition. Thus, a polyphosphate glass could be used to provide mechanical support for the diverter composition, and then after completion of the stimulation job, the polyphosphate would then function as a scale inhibitor.

In some embodiments, a sample of polymer (e.g., PLA) may be blended with a chemical additive (e.g., scale inhibitor, corrosion inhibitor, biocide, paraffin inhibitor, asphaltene inhibitor, flowback surfactant, emulsion breaker, and the like) in an extruder or other production process such that as the polymer matrix degrades the entrapped additive is released and provides the desired benefit to the well during the production phase. In some embodiments, the chemical additives can be incorporated into the polymer backbone of the non-deformable particle particles. In other embodiments, similar chemical additives may be incorporated into the deformable particle portion of the diverter composition (either in the polymer backbone or as blended additives) and provide analogous benefit to the well during the production phase. In some embodiments, it may be desirable to incorporate multiple, distinct non-deformable particle particles and/or multiple, distinct deformable particles with separate but desired chemical functionalities, such as those listed above, into a single blend.

One of skill in the art would understand that the method of making the diverter composition is not limited in any way by the order of ingredients added. In embodiments, the deformable and non-deformable particles are added to a polymer material produced via gel polymerization/drying, extrusion, suspension polymerization, precipitation polymerization, solution polymerization, or other suitable methods. In embodiments, the non-deformable particles also are an inorganic material produced or refined using any of a wide range of suitable methods: sintering, crystallization, precipitation, casting, processing in a kiln/furnace, or others.

In embodiments, the non-deformable particles are incorporated into the reaction mixture of the deformable particles prior to polymerization. The reverse is also possible as well. In embodiments, the deformable particles are present in larger quantity than the non-deformable particles.

Depending on the well type, well age, the particle types size, and other factors, the diverter composition can be formulated with the appropriate deformable particle and non-deformable particle particles In some embodiments, a method for treating a subterranean formation includes introducing into the subterranean formation via a well-bore a first treatment fluid comprising a diverter composition, the diverter composition comprising a combination of at least one deformable particle and at least one non-deformable particle; and allowing the diverter composition to block the flow of at least a portion of a treatment fluid from a first location within the well-bore to a second location.

In other embodiments, a method for treating a subterranean formation includes introducing into the subterranean formation via a well-bore a first treatment fluid comprising a diverter composition, the diverter composition comprising a combination of at least one degradable, deformable particle and at least one degradable, non-deformable particle; and allowing the diverter composition to block the flow of at least a portion of a treatment fluid from a first location within the well-bore to a second location.

In some embodiments, "introducing," includes injecting, pumping, pouring, circulating or otherwise placing fluid or material.

In embodiments, the diverter composition is injected at a permeable zone of the subterranean formation. In other embodiments, diverter composition is injected at or near casing perforation or fracture immediately at the wellbore.

As the diverter composition travels into the fracture network in the subterranean formation, the diverter composition, depending on the deformable particles used may gradually mix with the fluid contained in the subterranean formation, and eventually, the deformable particle may be exposed to sufficient fluid to swell and fill the fractures.

In some embodiments, the diverter composition bridges, plugs, or fills the previously fractured network temporarily to divert other fluids (e.g. fracturing fluids) to desired, untreated areas in the subterranean formations. In embodiments, after the diversion is no longer required, the diverter composition is degraded and removed by exposing the diverter composition to an appropriate condition or treatment for degradation. In some embodiments, degradation is such that the viscosity of the fluid that is formed after the degradation of the diverter composition breaks down is sufficiently low (e.g. such that flow back can occur.)

Several methods may be applied for removal of the created plugs. If the diverter composition contains degradable materials, degradation (e.g. by hydrolysis) can occur. If the diverter composition contains material reacting with chemical agents, those are removed by reacting with other agents. If the diverter composition contains melting material, melting may result in reduction in mechanical stability of the plug. If the diverter composition contains water soluble or hydrocarbon soluble materials plug removal may be achieved through physical dissolution of at least one of the components of the diverter composition in the surrounding fluid. In embodiments, solubility of the components in the diverter composition are dependent on temperature. In embodiments, degradation of at least one component of the diverter composition occurs. Plug removal may be also achieved through degradation of the diverter composition into smaller pieces that are flushed away.

In embodiments, after the need for diversion has passed, additional fluids, same or different from the previous fluids, may be flowed into subterranean formation for further treatments or operations. Any treatments or operations can be used after the subterranean formation has been treated with the diverter composition, including but not limited to stimulation, completion, fracturing, acidizing, workover, and combinations thereof.

In some embodiments, the diverter composition can be provided as a kit. The kit may include the diverter composition as a solid composition. The kit may further include one or more containers configured to store, transport, mix, or dispense the diverter compositions; and optionally, instructions for use of the diverter composition. The one or more containers may comprise, consist essentially of, or consist of a bottle, a drum, a tank, can, or any other container suitable to hold the diverter composition therein.

The diverter composition can include one, two, three or four different diverters provided in a single formulation and provided as a solid composition. In some embodiments, the diverter composition is provided as a solid blend of deformable and non-deformable particles as a single formulation. In other embodiments, the diverter composition can be provided as solids of the deformable and non-deformable particles separately. The separate components can be mixed before, after or simultaneously when introduced into a subterranean formation. In some embodiments, the kit may include one or more of any of the diverter compositions and/or any components thereof (e.g., additive(s)) disclosed herein. For example, the kit may include a diverter composition comprising, consisting essentially of, or consisting of one or more deformable and non-deformable particle particles in a carrier fluid. Other additives (e.g., surfactants, stabilizers and the like) may be added to the diverter composition before use. In other embodiments, the other additives are supplied separately in the kit and mixed with the diverter composition at the time of use. In one embodiment, the kit includes deformable and non-deformable particle particles as a dry blend as a single formulation. In other embodiments, the kit includes degradable, deformable particles and degradable, non-deformable particle particles as a dry blend as a single formulation.

The carrier fluid may be either aqueous or organic, depending on the diverter composition of the deformable and non-deformable particle particles, and may also incorporate surfactants, stabilizers, suspension aids, or other additives to ensure composition stability and performance. Depending on the method(s) of production of the two components, the carrier fluid may be added to the preformed solids (or vice versa, if order of addition matters), or it may be present as a solvent or reaction medium prior to formation of one or both of the particles.

In embodiments, the carrier fluid is one or more paraffinic oils, aromatic oils, mineral oils, silicone oils, alkanols, glycols, glycol ethers, glycol esters, carbitols, hydrotropes, high salinity brine, or mixtures thereof.

The kit may include instructions for use of the diverter composition. The instructions may include directions detailing how to mix, store, transport, dilute, or dispense the composition. For example, the instructions may include directions detailing the flow rate, the pressure and temperature that the diverter composition can be used for a particular subterranean topography.

Some additional non-limiting embodiments are provided below to further exemplify the present disclosure:

1. A method for treating a subterranean formation, comprising:

introducing into the subterranean formation via a well-bore a first treatment fluid comprising a diverter composition, the diverter composition comprising a combination of at least one deformable particle and at least one non-deformable particle; and allowing the diverter composition to block the flow of at least a portion of the first treatment fluid from a first location within the well-bore diverting flow to a second location.

2. A method for treating a subterranean formation, comprising:

providing a first treatment fluid comprising a diverter composition, the diverter composition comprising a combination of at least one deformable particle and at least one non-deformable particle;

introducing into the subterranean formation via a wellbore the diverter composition, allowing the diverter composition to block the flow of at least a portion of a first treatment fluid from a first location within the well-bore diverting flow to a second location.

3. A method for treating a subterranean formation, comprising:

introducing into the subterranean formation via a well-bore a first treatment fluid comprising a diverter composition, the diverter composition comprising a combination of at least one degradable, deformable particle and at least one degradable, non-deformable particle; and allowing the diverter composition to block the flow of at least a portion of the first treatment fluid from a first location within the well-bore diverting flow to a second location.

4. A method for treating a subterranean formation, comprising:

providing a first treatment fluid comprising a diverter composition, the diverter composition comprising a combination of at least one degradable, deformable particle and at least one degradable, non-deformable particle;

introducing into the subterranean formation via a well-bore the diverter composition, allowing the diverter composition to block the flow of at least a portion of a first treatment fluid from a first location within the well-bore diverting flow to a second location.

5. The method as in any one of the preceding embodiments further comprising allowing the diverter composition to block the flow of at least a portion of a second treatment fluid from a first location within the well-bore diverting flow to a second location.

6. The method as in any one of the preceding embodiments, wherein the first treatment fluid, the second treatment fluid or both treatment fluids comprise a fracturing fluid.

7. The method as in any one of the preceding embodiments, wherein the first treatment fluid, the second treatment fluid or both treatment fluids comprise an acidic fluid.

8. The method as in any one of the preceding embodiments, wherein the first treatment fluid comprises an aqueous based fluid, a brine, or produced water.

9. The method as in any one of the preceding embodiments, wherein the diverter composition is present in the first treatment fluid at a concentration of 1,000 to 200,000 ppm.

10. The method as in any one of the preceding embodiments, wherein the deformable particles are present from about 1 wt % to about 99 wt % of the diverter composition.

11. The method as in any one of the preceding embodiments, wherein the deformable particles are present from about 5 wt % to about 75 wt % of the diverter composition.

12. The method as in any one of the preceding embodiments, wherein the deformable particles are present from about from 10 wt % to 70 wt % of the diverter composition.

13. The method as in any one of the preceding embodiments, wherein the deformable particles are swellable particles.

14. The method as in any one of the preceding embodiments, wherein the at least one deformable particles comprise crosslinked polyacrylamide, crosslinked polyacrylate, crosslinked hydrolyzed polyacrylonitrile, salts of carboxyalkyi starch, salts of carboxymethyl starch, salts of carboxyalkyi cellulose, hydroxylethyl cellulose, salts of crosslinked carboxyalkyi polysaccharide, crosslinked copolymers of acrylamide and acrylate monomers, starch grafted with acrylonitrile and acrylate monomers, crosslinked polymers of two or more of allylsulfonates, 2-acrylamido-2-methyl-1-propane-sulfonic acid, 3-allyloxy-2-hydroxy-1-propane-sulfonic acid, diallyl-dimethylammonium salts, benzyl-diallylmethylammonium salts, methacrylamidopropyltrimethylammonium salts, acrylamidopropyltrimethylammonium salts, acrylamide, acrylic acid, acrylate monomers, N-vinylformamide, N-vinylpyrrolidone, vinyl acetate, and any combination thereof.

15. The method as in any one of the preceding embodiments, wherein the at least one deformable particles comprise polyacrylamide homopolymer or copolymer.

16. The method as in any one of the preceding embodiments, wherein the at least one deformable particles comprises an average particle size range from about 0.05 microns to about 100,000 microns.

17. The method as in any one of the preceding embodiments, wherein the at least one deformable particles comprises an average particle size range from about 0.1 to 10,000 microns.

18. The method as in any one of the preceding embodiments, wherein the at least one deformable particles comprises an average particle size range from about 1 to 5,000 microns.

19. The method as in any one of the preceding embodiments, wherein the at least one non-deformable particle particles comprise rock salt, polyesters, polyamides, polyethers, polycarbonates, polyurethanes, polysaccharides, peptides/polypeptides, urea-formaldehyde copolymer, other hydrolysable or degradable polymers, partially or wholly soluble or degradable inorganic salts, partially or wholly soluble or degradable metal oxides/hydroxides, other partially or wholly soluble or degradable inorganic materials (polyphosphates or other glasses, minerals, carbon materials and nanomaterials, silicas, aluminas), benzoic acid and other sparingly soluble organic compounds, natural plant- or biologically-derived materials, fibrous materials and combinations thereof.

20. The method as in any one of the preceding embodiments, wherein the at least one non-deformable particle particles comprise poly(lactic acid) or polyethylene terephthalate.

21. The method as in any one of the preceding embodiments, wherein the at least one non-deformable particles are present from about 1 wt % to about 99 wt % of the diverter composition.

22. The method as in any one of the preceding embodiments, wherein the at least one non-deformable particles are present from about 20 wt % to 50 wt % of the diverter composition.

23. The method as in any one of the preceding embodiments, wherein the at least one non-deformable particles are present from about 10 wt % to 50 wt % of the diverter composition.

24. The method as in any one of the preceding embodiments, wherein the at least one non-deformable particle comprises an average particle size range from about 0.05 mm to 65 mm.

25. The method as in any one of the preceding embodiments, wherein the first location is a permeable zone of the subterranean formation.

26. The method as in any one of the preceding embodiments, wherein the first location is a casing perforation or fracture immediately at the wellbore.

27. The method as in any one of the preceding embodiments, wherein the second location is a less permeable zone of the subterranean formation.

28. The method as in any one of the preceding embodiments, wherein the deformable particles and non-deformable particle particles are degradable.

29. The method as in any one of the preceding embodiments, wherein the non-deformable particles comprises polylactic acid.

30. The method as in any one of the preceding embodiments, wherein the diverter composition withstands a pressure of 10 psi to 20,000 psi.

31. The method as in any one of the preceding embodiments, wherein the deformable particles surround an inner core comprising non-deformable particles.

32. A diverter composition comprising a combination of at least one deformable particle and at least one non-deformable particle.

33. The diverter composition of claim 32, wherein the at least one deformable particle surrounds an inner core comprising at least one non-deformable particle.

34. The diverter composition of claim 32, wherein the composition is provided as a dry blend.

35. The diverter composition of any one of embodiments 32-34, wherein the composition comprises polyacrylamide and polylactic acid.

36. A diverter composition of any one of embodiments 32, 33 or 35, wherein the diverter composition comprises a combination of at least one deformable particle and at least one non-deformable particle and a carrier fluid.

37. Use of the diverter composition as in as in in any one of the preceding embodiments to treat a subterranean formation or divert the flow of a treatment fluid.

EXAMPLES

Example 1

A deformable, polymer, which is a copolymer of acrylamide, acrylic acid, and N-vinylformamde cross-linked with a mixture of tetraethylene glycol diacrylate (TEGDA) and methylene bisacrylamide (MBA) was prepared by gel polymerization, and was dried, ground/crushed, and sized to the particle size shown in the Table 1.

The dried, deformable polymer was then blended with a commercially available sample of poly(lactic acid) (PLA) MaxVert™ available through Impact Fluid Solutions, LP according to the mass ratios shown in Table 1.

A PLA-free sample (Sample 1) corresponds to only the sample of the deformable polymer, with the particle size information shown in Table 1.

For the other samples, the blends of deformable polymer and PLA were prepared by dry blending the two materials together.

TABLE 1

| Sample | (deformable gel polymer) <30 mesh | 4-8 mesh | PLA | Median Particle Size (vol. basis; μm) | Median Particle Size (num. basis; μm) |
|---|---|---|---|---|---|
| Sample 1 | 70% | 30% | 0% | 1727.3 | 53.7 |
| Sample 2 | 53% | 23% | 25% | 1846.6 | 49.3 |
| Sample 3 | 35% | 15% | 50% | 1773.6 | 56.2 |
| Sample 4 (PLA) | 0% | 0% | 100% | 1860.0 | 153.0 |

The samples with the amounts of deformable polymers and PLA and the particle size information for each sample is shown in Table 1.

Sample 4 is only PLA tested for comparison purposes.

Following preparation of these samples, they were tested in specialized testing equipment. As-prepared blends, the samples indicated above, were added into a solution of xanthan carrier fluid at a diverter concentration of 20 lbs/bbl. This slurry was fed into a high pressure test cell equipped with a tapered slot at the outlet. The slot was intended to function as a model fracture/perforation. Once loaded into the test cell and hydrated for a desired period of time (0-30 minutes), the cell was pressurized with nitrogen, initially at 500 PSI and then stepped up gradually to 1000 PSI. If the blends are effective as diverters, it would be expected to plug (also referred to as "bridge") the tapered slot, preventing any fluid escape from the open end of the tapered slot.

The results of these tests are shown in FIGS. 1-4. FIG. 1 shows a graph of the sample of only deformable polymer (without any PLA, Sample 1) held at a pressure of 500 PSI with relatively little fluid loss. As the pressure was increased to 750 PSI the plug failed as determined by the fluid contained in the test cell escaping uncontrolled and rapidly out of the bottom of the tapered slot.

After failure of the plug, the tapered slot was removed and opened. The tapered slot showed a channel that had been drilled through the deformable polymer by the high pressure fluid (data not shown).

Figure 2:
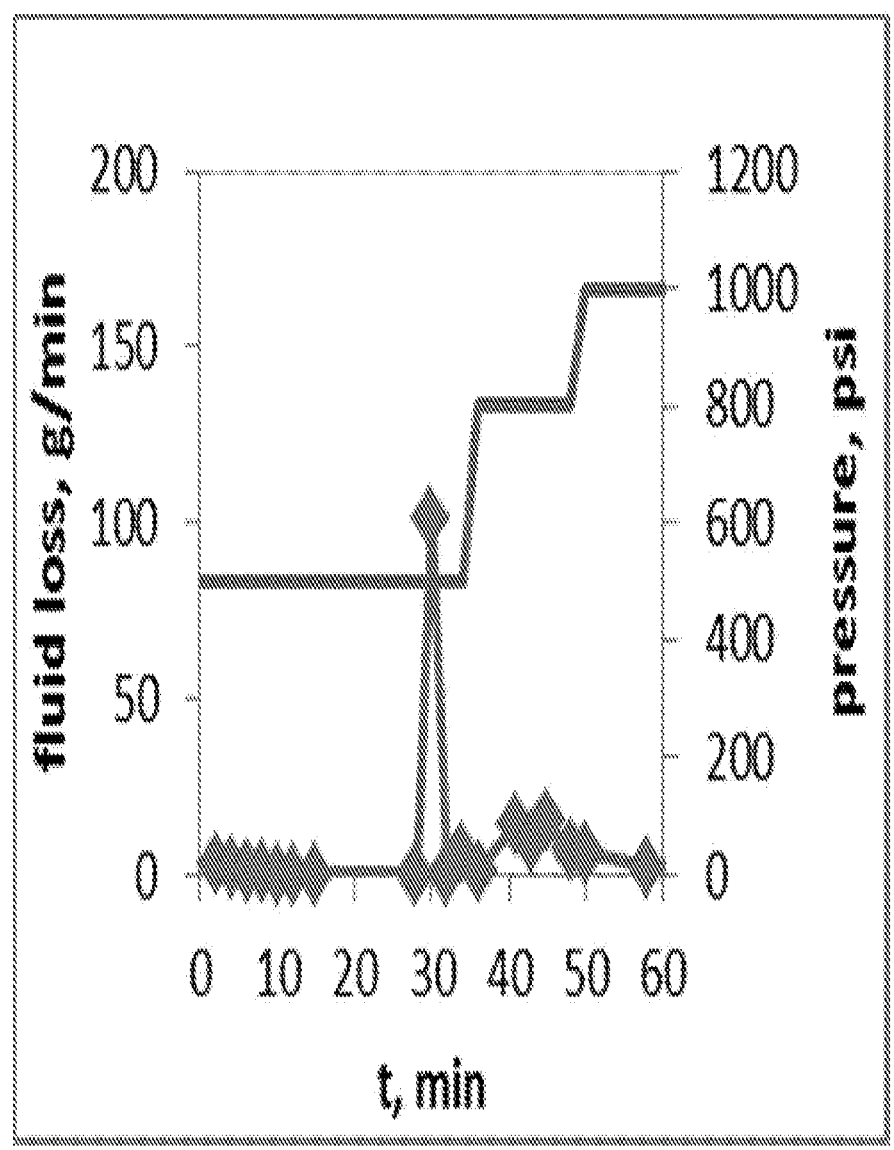
FIG. 2 is a graph showing fluid loss for an embodiment of a composition containing a deformable particle and a non-deformable particle with respect to pressure and time.

Sample 2 (blended sample containing 75 wt % deformable polymer and 25 wt % commercially available PLA) as seen in FIG. 2 showed very high resistance to pressure and very little leak off over the course of the entire test. The pressure was able to be increased to 1000 PSI and held for 30 minutes at each pressure stage with no indications of failure.

After the conclusion of the test with sample 2, the tapered slot was removed and opened. The tapered slot showed a thoroughly blocked fluid path, consisting of a mixture of hard, non-deformable particles and deformable (data not shown).

Figure 3:
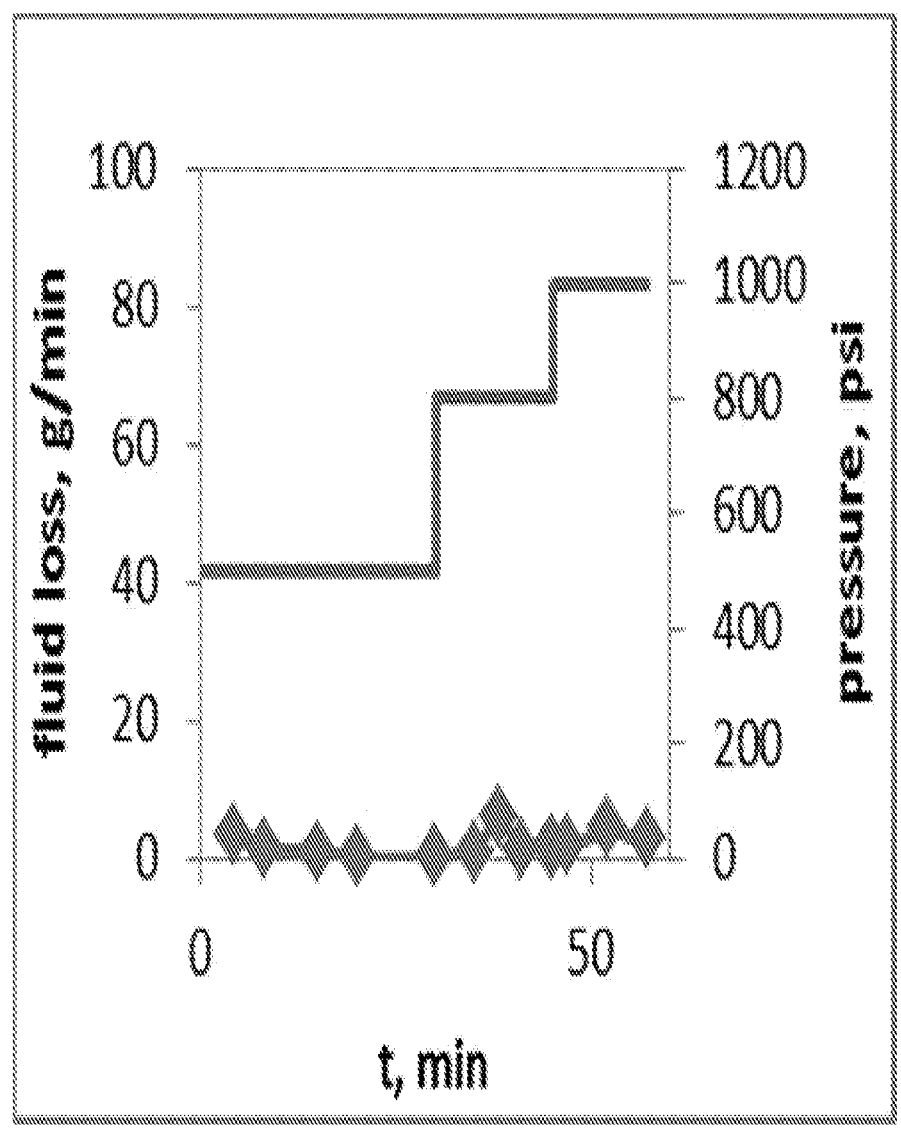
FIG. 3 is a graph showing fluid loss for an embodiment of a composition containing a deformable particle and a non-deformable particle deformable particle with respect to pressure and time.

Sample 3 (the blended sample containing 50 wt % deformable polymer and 50 wt % commercially available PLA) as see in FIG. 3 showed very high resistance to pressure and very little leak off over the course of the entire test. The pressure was able to be increased to 1000 PSI and held for 30 minutes at each pressure stage with no indications of failure.

After the conclusion of the test, the tapered slot was removed and opened. The tapered slot showed a thoroughly blocked fluid path, consisting of a mixture of hard, non-deformable particles and deformable polymer.

Figure 4:
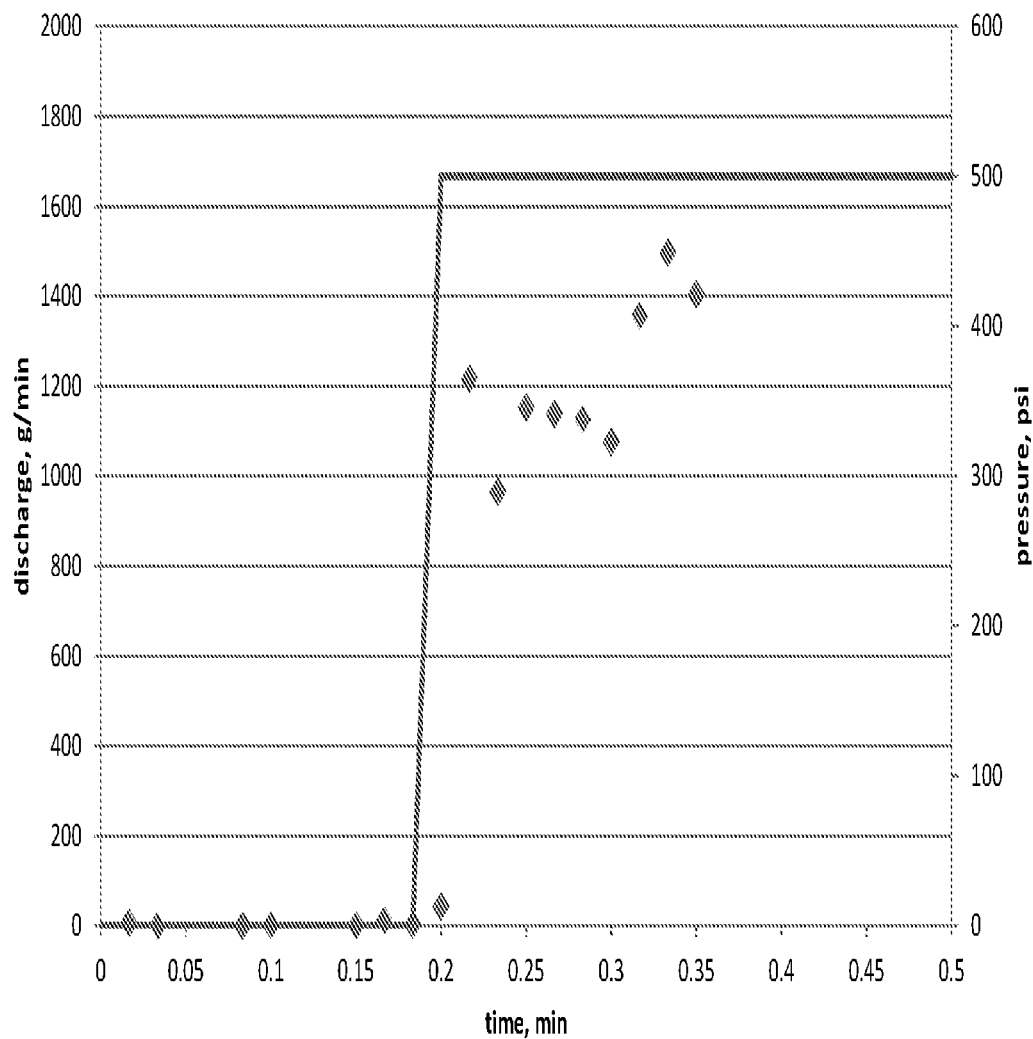
FIG. 4 is a graph showing fluid loss for a deformable and non-deformable particle only particle with respect to pressure and time.

Sample 4, (commercially available PLA on its own) as seen in FIG. 4 showed negligible ability to block fluid flow, even at minimal applied pressure (500 PSI). Immediately after pressure was applied to the test cell, significant fluid leakoff occurred immediately and continued until the test cell was fully drained (up to 1500 g/min of fluid loss). After the conclusion of the test, the tapered slot was removed and opened. The tapered slot showed effective bridging and a blocked fluid path. However, it appears that the lack of deformable and/or malleable particles allowed the fluid to readily permeate through the bed of particles. This result strongly suggests that PLA alone is insufficient to create the desired blockage of fluid flow, relative to deformable and/or malleable particles alone or mixtures of deformable and/or malleable particles and hard particles, and that there is clear beneficial synergism when the two classes of material are mixed together.

What is claimed is:

1. A diverter composition comprising:
    a combination of deformable particles and non-deformable particles, wherein the deformable particles and the non-deformable particles are degradable,
        wherein the deformable particles consist of deformable polymer selected from
    (i) crosslinked copolymers of acrylamide, acrylate, and vinylformamide monomers,
    (ii) starch grafted with acrylonitrile and acrylate monomers,
    (iii) crosslinked polymers of two or more of allylsulfonates, 2-acrylamido-2-methyl-1-propanesulfonic acid, 3-allyloxy-2-hydroxy-1-propane-sulfonic acid, diallyl dimethylammonium salts, benzyl diallylmethylammonium salts, methacrylamidopropyltrimethylammonium salts, acrylamidopropyltrimethylammonium salts, and
    (iv) any combination thereof, and
        wherein the non-deformable particles consist of a material selected from polyesters, polyamides, polyethers, polycarbonates, polyurethanes, peptides, polypeptides, urea-formaldehyde copolymers, poly (lactic acid), polyethylene terephthalate, and combinations thereof.

2. The diverter composition of claim 1, wherein the deformable particles are present from about 1 wt % to about 99 wt % of the diverter composition.

3. The diverter composition of claim 1, wherein the deformable particles are swellable particles.

4. The diverter composition of claim 1, wherein the deformable particles have a volume average particle size from about 0.05 microns to about 100,000 microns.

5. The diverter composition of claim 1, wherein the non-deformable particles consist of poly(lactic acid) or polyethylene terephthalate.

6. The diverter composition of claim 1, wherein the non-deformable particles are present from about 1 wt % to about 99 wt % of the diverter composition.

7. The diverter composition of claim 1, wherein the non-deformable particles have a volume average particle size range from about 0.05 mm to 65 mm.

8. The diverter composition of claim 1, wherein the non-deformable particles consist of poly(lactic acid).

9. The diverter composition of claim 1, wherein the diverter composition is present in a first treatment fluid at a concentration of 1,000 to 200,000 ppm.

10. The diverter composition of claim 1, wherein the diverter composition withstands a pressure of 10 psi to 20,000 psi.

11. The diverter composition of claim 1, wherein the composition is provided as a dry blend.

12. The diverter composition of claim 1, further comprising a carrier fluid.

13. The diverter composition of claim 1, the deformable particles consisting of a crosslinked copolymer of acrylamide, acrylic acid, and N-vinyl formamide.

14. The diverter composition of claim 13, wherein the copolymer of acrylamide, acrylic acid, and N-vinylformamide is crosslinked with a mixture of tetraethylene glycol diacrylate and methylene bisacrylamide.

15. The diverter composition of claim 1, wherein the deformable particles consist of a cmsslinked copolymer of acrylamide, acrylic acid, and N-vinyl formamide.

16. The diverter composition of claim 1, wherein the non-deformable particles consist of poly(lactic acid).

17. The diverter composition of claim 1, wherein the deformable particles are present in the diverter composition from 5 wt % to about 75 wt % of the diverter composition, and wherein the non-deformable particles are present in the diverter composition at from about 20 wt % to 50 wt % of the diverter composition.

18. The diverter composition of claim 1, wherein the non-deformable particles consist of poly(L-lactic acid) or poly(D-lactic acid).

19. The diverter composition of claim 1, wherein the deformable particles consist of starch grafted with acrylonitrile and acrylate monomers.

\* \* \* \* \*